United States Patent
Salli et al.

(10) Patent No.: US 11,157,301 B2
(45) Date of Patent: Oct. 26, 2021

(54) SYSTEMS AND METHODS FOR IMPROVED MANAGEMENT OF VIRTUAL MACHINE CLUSTERS

(71) Applicant: JPMorgan Chase Bank, N.A., New York, NY (US)

(72) Inventors: Tommi Salli, Stamford, CT (US); Kirk A. Frey, Flemington, NJ (US); David J. Sullivan, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 144 days.

(21) Appl. No.: 16/274,995

(22) Filed: Feb. 13, 2019

(65) Prior Publication Data
US 2019/0250939 A1    Aug. 15, 2019

Related U.S. Application Data

(60) Provisional application No. 62/630,977, filed on Feb. 15, 2018.

(51) Int. Cl.
*G06F 9/455* (2018.01)
*H04L 29/08* (2006.01)

(52) U.S. Cl.
CPC .......... *G06F 9/45558* (2013.01); *H04L 67/10* (2013.01); *G06F 2009/45591* (2013.01)

(58) Field of Classification Search
CPC .................................................. G06F 9/45558
See application file for complete search history.

(56) References Cited

U.S. PATENT DOCUMENTS

| | | | | |
|---|---|---|---|---|
| 9,465,630 | B1* | 10/2016 | Muniz | ...................... G06F 9/455 |
| 2013/0332608 | A1* | 12/2013 | Shiga | .................... G06F 9/5088 |
| | | | | 709/226 |
| 2014/0019964 | A1* | 1/2014 | Neuse | ................. G06F 9/45558 |
| | | | | 718/1 |
| 2014/0165063 | A1 | 6/2014 | Shiva et al. | |

OTHER PUBLICATIONS

International Searching Authority, PCT International Search Report and Written Opinion, International Application No. PCT/US19/18179, dated Apr. 25, 2019, pp. 1-10.

* cited by examiner

*Primary Examiner* — Sisley N Kim
(74) *Attorney, Agent, or Firm* — Greenberg Traurig LLP (57) ABSTRACT

In one embodiment, a method for improved management of virtual machine clusters may include: determining a current utilization value for each of a plurality of virtual machines (VMs) in a cluster, the VMs associated with a plurality of applications; storing the current utilization values for each of the plurality of VMs in a utilization table; determining that a capacity threshold for the cluster has not been reached based on an aggregation of the current utilization values for the plurality of VMs; provisioning a new VM into the cluster; storing a default utilization value for the new VM in the utilization table; and re-determining the capacity threshold based on the aggregated stored current utilization values for the plurality of VMs and the stored default utilization value for the new VM until a maturity threshold for the new VM is reached.

14 Claims, 4 Drawing Sheets

SYSTEMS AND METHODS FOR IMPROVED MANAGEMENT OF VIRTUAL MACHINE CLUSTERS

RELATED APPLICATIONS

This application claims the benefit of U.S. Provisional Patent Application Ser. No. 62/630,977, filed Feb. 15, 2018, the disclosure of which is hereby incorporated, by reference, in its entirety.

BACKGROUND OF THE INVENTION

1. Field of the Invention

The present disclosure generally relates to systems and methods for improved management of virtual machine clusters.

2. Description of the Related Art

Many enterprise networks include clusters of virtual machines ("VMs") or virtual servers executing application instances and operating on host machines to provide users with access to enterprise applications. Host machine clusters are often managed automatically and dynamically so that VMs are provisioned according to utilization and capacity of the cluster.

When VMs are created, however, their utilization is relatively low, or even non-existent, because application loads and production preparations take time. VMs may continue to be provisioned into a cluster, based on a determined cluster capacity, although the cluster may be unable to service the demand for resources by the VMs when the VMs reach their business or production load. Accordingly, an inaccurate calculation of cluster capacity may result in the over-allocation of existing resources and increased application performance issues and support escalations.

SUMMARY OF THE INVENTION

Systems and methods for improved management of virtual machine clusters are disclosed. In one embodiment, in a cluster management device comprising at least one computer processor, a method for improved management of virtual machine clusters may include: (1) determining a current utilization value for each of a plurality of virtual machines (VMs) in a cluster, the VMs associated with a plurality of applications; (2) storing the current utilization values for each of the plurality of VMs in a utilization table; (3) determining that a capacity threshold for the cluster has not been reached based on an aggregation of the current utilization values for the plurality of VMs; (4) provisioning a new VM into the cluster; (5) storing a default utilization value for the new VM in the utilization table, wherein the default utilization value is based on a utilization metric for an application that is to be associated with the new VM or a pre-set utilization value; and (6) re-determining the capacity threshold based on the aggregated stored current utilization values for the plurality of VMs and the stored default utilization value for the new VM until a maturity threshold for the new VM is reached.

In one embodiment, the method may further include storing an indicator in the utilization table indicating that the new VM has not met the maturity threshold.

In one embodiment, the current utilization value for the new VM is not stored in the utilization table in response to the new VM not meeting the maturity threshold.

In one embodiment, the maturity threshold may be based on an age of the new VM.

In one embodiment, utilization metric value may be based on an average utilization or a maximum utilization for the application.

In one embodiment, the utilization metric for the application may be determined before the new VM is provisioned.

In one embodiment, the default utilization value may be replaced with a current utilization value for the new VM when the maturity threshold for the new VM is reached.

According to another embodiment, in a cluster management device comprising at least one computer processor, a method for improved management of virtual machine clusters may include: (1) determining a current utilization value for each of a plurality of virtual machines (VMs) in a cluster, the VMs associated with a plurality of applications; (2) storing the current utilization values for each of the plurality of VMs in a utilization table; (3) retrieving a default utilization value for a new VM in the cluster that has not met a maturity threshold from the utilization table, wherein the default utilization value is based on a utilization metric for an application that is to be associated with the new VM or a pre-set utilization value; (4) determining that a capacity threshold for the cluster has been reached based on an aggregation of the current utilization values for the plurality of VMs and the default utilization value; (5) determining that the new VM has met a maturity threshold; and (6) replacing the default utilization value with a current utilization value for the new VM.

In one embodiment, the method may further include removing an indicator from the utilization table that the new VM has not me the maturity threshold.

In one embodiment, the method may further include re-determining the capacity threshold based on the aggregated stored current utilization values for the plurality of VMs and the stored utilization value for the new VM.

In one embodiment, the maturity threshold may be based on an age of the new VM.

In one embodiment, the utilization metric value may be based on an average utilization or a maximum utilization for the application.

In one embodiment, the utilization metric for the application may be determined before the new VM is provisioned.

According to another embodiment, a system for improved management of virtual machine (VM) clusters may include a cluster comprising a plurality of virtual machines (VMs), the VMs associated with a plurality of applications; and a cluster management device comprising at least one computer processor and a memory storing a utilization table, the cluster management device in communication with the VMs. The cluster management device may perform the following: (1) determine a current utilization value for each of the plurality of VMs in the cluster; (2) store the current utilization values for each of the plurality of VMs in the utilization table; (3) determine that a capacity threshold for the cluster has not been reached based on an aggregation of the current utilization values for the plurality of VMs; (4) provision a new VM into the cluster; (5) store a default utilization value for the new VM in the utilization table, wherein the default utilization value is based on a utilization metric for an application that is to be associated with the new VM or a pre-set utilization value; and (6) re-determine the capacity threshold based on the aggregated stored current utilization values for the plurality of VMs and the stored default utilization value for the new VM until a maturity threshold for the new VM is reached.

In one embodiment, the cluster management device may store an indicator in the utilization table indicating that the new VM has not met the maturity threshold.

In one embodiment, the current utilization value for the new VM may not be stored in the utilization table in response to the new VM not meeting the maturity threshold.

In one embodiment, the maturity threshold may be based on an age of the new VM.

In one embodiment, the utilization metric value may be based on an average utilization or a maximum utilization for the application.

In one embodiment, the utilization metric for the application may be determined before the new VM is provisioned.

In one embodiment, the default utilization value may be replaced with a current utilization value for the new VM when the maturity threshold for the new VM is reached.

According to one embodiment, a method for improved management of virtual machine (VM) clusters that is implemented by one or more cluster management devices may include: (1) determining when a capacity threshold is reached for a cluster based on stored current utilization values for a plurality of VMs in the cluster, wherein the VMs are associated with a plurality of applications; (2) provisioning at least one new VM into the cluster, when the determining indicates that the capacity threshold has not been reached for the cluster, wherein the new VM is associated with one of the applications; (3) determining a utilization metric value for a subset of the VMs associated with the one of the applications; and (4) storing a current utilization value for the new VM based on the utilization metric value, wherein the stored current utilization value is utilized to determine when the capacity threshold is reached for the cluster in one or more subsequent iterations until a maturity threshold is reached for the new VM.

According to another embodiment, a cluster management device may include memory comprising programmed instructions stored thereon and one or more processors configured to be capable of executing the stored programmed instructions to: (1) determine when a capacity threshold is reached for a cluster based on stored current utilization values for a plurality of VMs in the cluster, wherein the VMs are associated with a plurality of applications; (2) provision at least one new VM into the cluster, when the determining indicates that the capacity threshold has not been reached for the cluster, wherein the new VM is associated with one of the applications; (3) determine a utilization metric value for a subset of the VMs associated with the one of the applications; and (4) store a current utilization value for the new VM based on the utilization metric value, wherein the stored current utilization value is utilized to determine when the capacity threshold is reached for the cluster in one or more subsequent iterations until a maturity threshold is reached for the new VM.

According to another embodiment, a non-transitory machine readable medium may include instructions stored thereon for improved management of virtual machine (VM) clusters comprising executable code which when executed by one or more processors, causes the one or more processors to: (1) determine when a capacity threshold is reached for a cluster based on stored current utilization values for a plurality of VMs in the cluster, wherein the VMs are associated with a plurality of applications; (2) provision at least one new VM into the cluster, when the determining indicates that the capacity threshold has not been reached for the cluster, wherein the new VM is associated with one of the applications; (3) determine a utilization metric value for a subset of the VMs associated with the one of the applications; and (4) store a current utilization value for the new VM based on the utilization metric value, wherein the stored current utilization value is utilized to determine when the capacity threshold is reached for the cluster in one or more subsequent iterations until a maturity threshold is reached for the new VM.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for improved management of virtual machine clusters.

Figure 1:
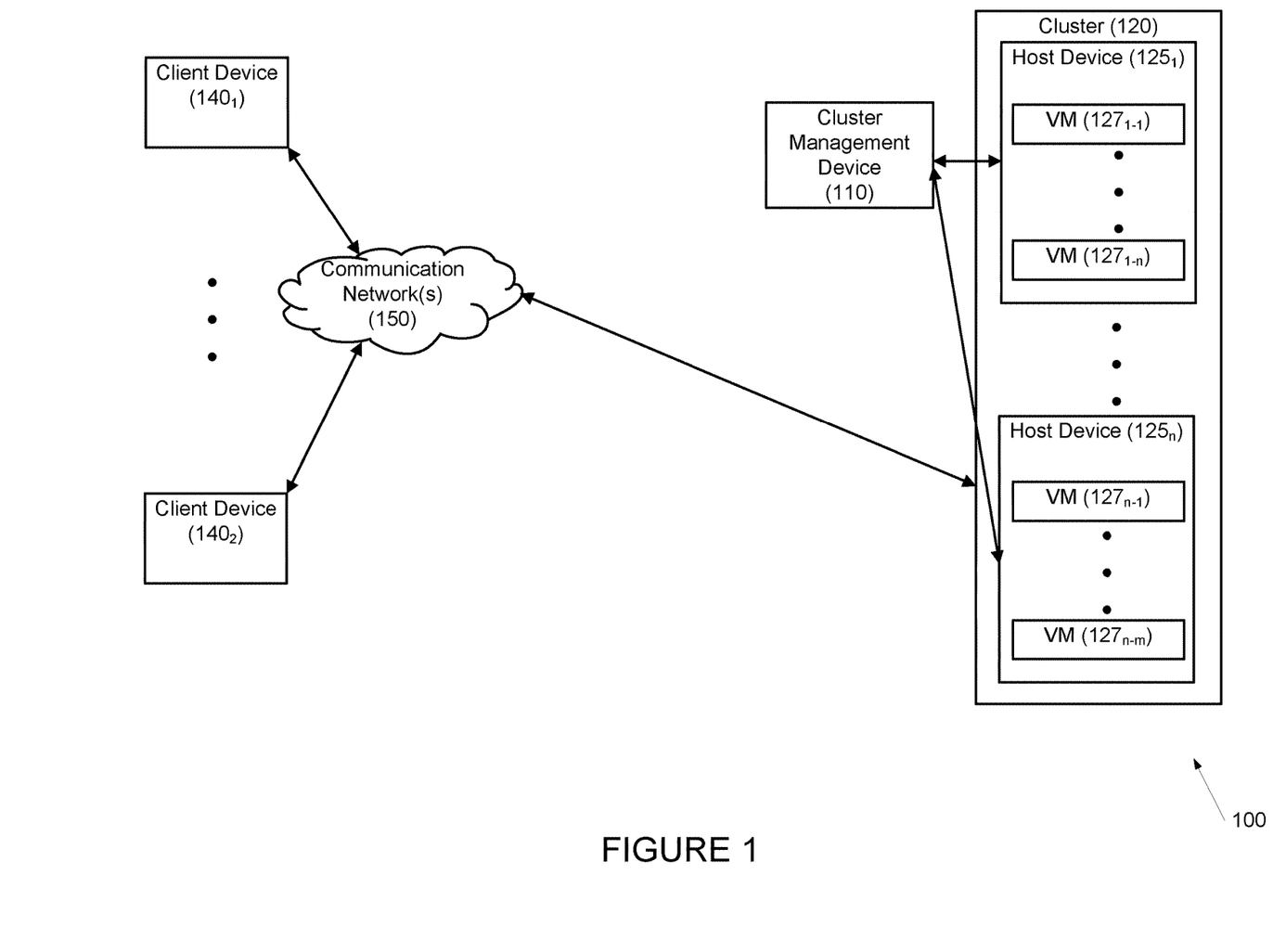
FIG. 1 depicts a system for improved management of virtual machine clusters according to one embodiment.

Referring to FIG. 1, a system for improved management of virtual machine clusters is disclosed according to one embodiment. System 100 may include cluster management device 110, cluster 120, client devices 140, and one or more communication network 150.

In one embodiment, cluster management device 110 may be coupled to a plurality of host devices $125_1$, $125_2$, ... $125_n$ of cluster 120. Cluster 120 may be coupled, via communication network(s) 150, to a plurality of client devices 140. It should be recognized that cluster management device 110, host devices 120, and/or client devices 140, may be coupled together via other topologies as is necessary and/or desired.

Each host device $125_1$, $125_2$, ... $125_n$ may hosts a plurality of virtual machines $127_1$, $127_2$, ... $127_n$, which may collectively comprise a cluster. This technology provides a number of advantages including methods, non-transitory computer readable media, and cluster management devices that more effectively provision VMs and manage cluster resources in order to improve application performance.

Figure 2:
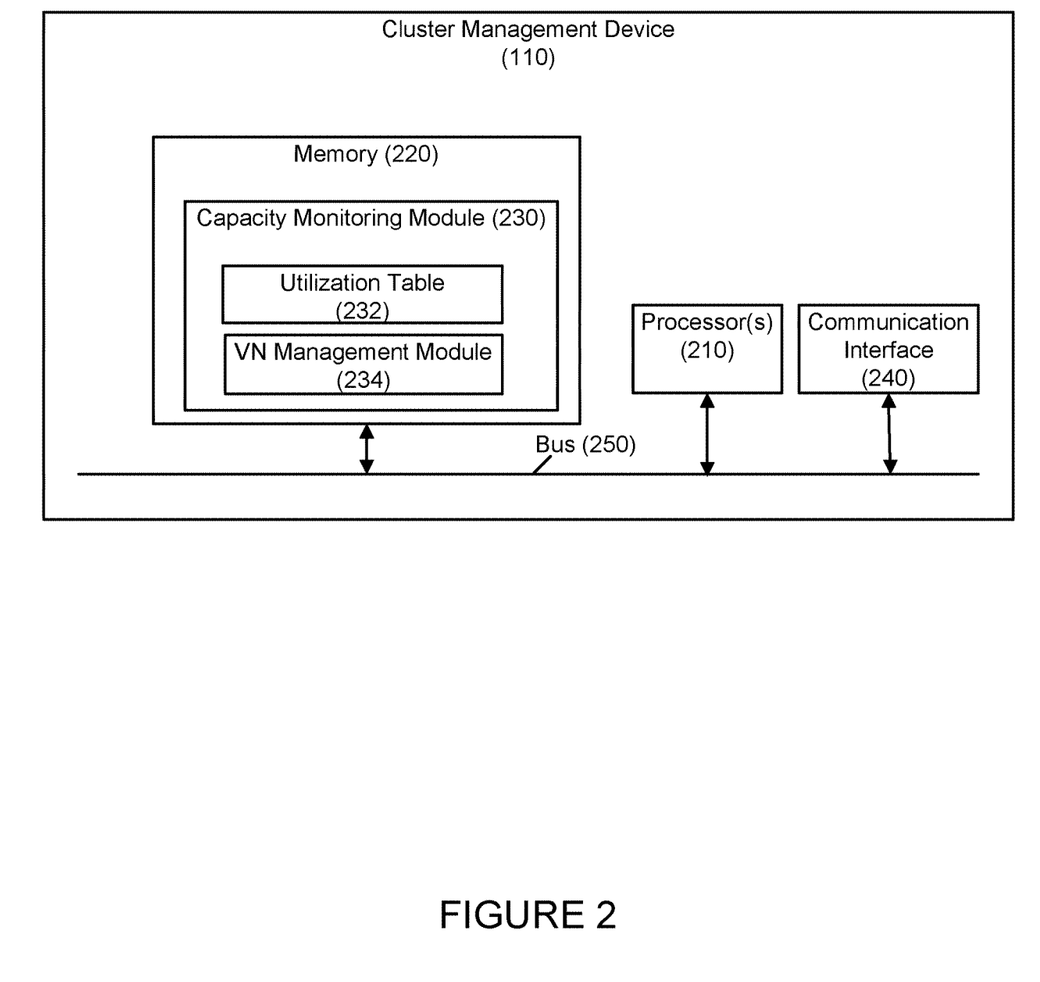
FIG. 2 depicts a block diagram of a cluster management device according to one embodiment.

Referring to FIG. 2, a block diagram of cluster management device 110 is provided according to one embodiment. Cluster management device 110 may include one or more computer processors 210, memory 220, and communication interface 240, which may be coupled by bus 250 or another suitable communication link, although cluster management device 110 may include other types and/or numbers of elements in other configurations. Processor 210 of cluster management device 110 may execute programmed instructions stored in memory 220 for any of the functions described and illustrated herein. Processor(s) 210 of cluster management device 110 may include one or more CPUs or general purpose processors with one or more processing cores, for example, although other types of processor(s) can also be used.

Memory 220 of cluster management device 110 may store the programmed instructions for one or more aspects of the present technology as described and illustrated herein, although some or all of the programmed instructions may be stored elsewhere. A variety of different types of storage devices, such as random access memory (RAM), read only memory (ROM), hard disk, solid state drives, flash memory, or other computer readable medium which is read from and written to by a magnetic, optical, or other reading and writing system that is coupled to the processor(s), may be used for memory 220 as is necessary and/or desired.

Figure 3:
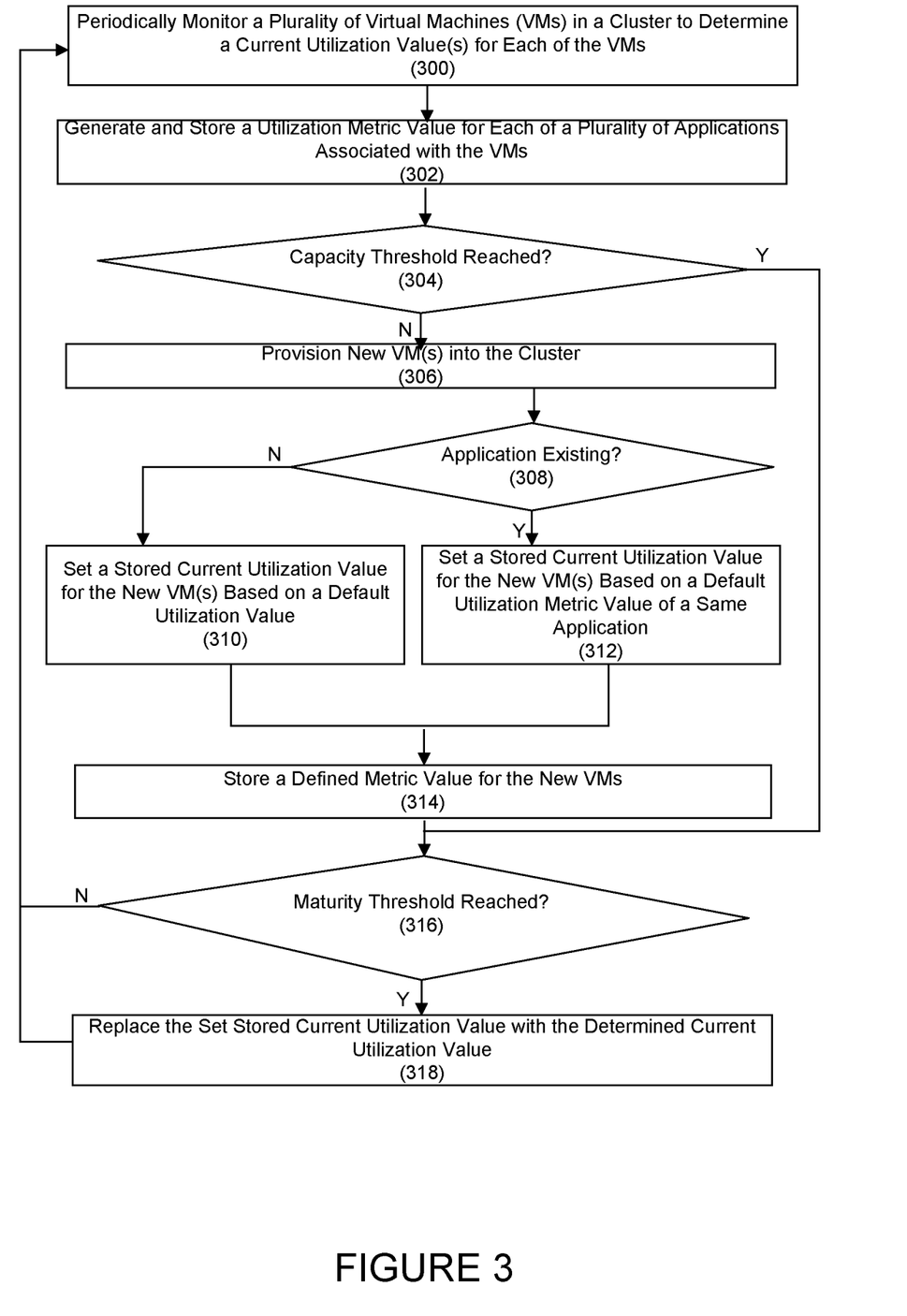
FIG. 3 depicts a flowchart of an exemplary method for improved management of VM clusters according to one embodiment.

Memory 220 of cluster management device 110 may store one or more applications that may include executable instructions that, when executed by cluster management device 110, cause cluster management device 110 to perform actions, for example, to transmit, receive, or otherwise process network messages, as well as actions described and illustrated below with reference to FIGS. 3 and 4. The application(s) may be implemented as modules or components of other applications. Further, the application(s) may be implemented as operating system extensions, module, plugins, or the like.

In one embodiment, the application(s) may be operative in a cloud-based computing environment. The application(s) may be executed within or as virtual machine(s) or virtual server(s) that may be managed in a cloud-based computing environment. In addition, the application(s), and even cluster management device 110 itself, may be located in one or more virtual server(s) running in a cloud-based computing environment rather than being tied to one or more specific physical network computing devices.

In one embodiment, the application(s) may be running in one or more VMs (not shown) that may be executing on cluster management device 110.

In one embodiment, memory 220 of cluster management device 110 may include capacity monitoring module 230, which may include utilization table 232 and VM management module 234. It should be noted that memory 220 may include other policies, modules, databases, or applications, as is necessary and/or desired.

Capacity monitoring module 230 may monitor utilization (e.g., CPU and memory utilization) of VMs 127 of cluster 120, and may store corresponding utilization values in utilization table 232. Utilization table 232 may be a database, data store, or other data structure capable of maintaining the utilization values associated with VMs 127. Capacity monitoring module 230 may also generate and maintain, in utilization table 232, a defined utilization for each application corresponding to one or more of VMs 127

In one embodiment, capacity monitoring module 230 may monitor utilization levels of VMs 127 to determine whether there is additional capacity in cluster 120 based on the resources available on host devices 130. This may be done periodically, on demand, or as otherwise necessary and/or desired. VM management module 234 may determine when a new VM may be provisioned, such as when there is sufficient available capacity the cluster 120.

In one embodiment, VM management module 234 may communicate with the host device(s) 125 to provision VMs 127 based on an available capacity of cluster 120, which may be determined based on the stored utilization values for the VMs 127.

In order to reduce the likelihood of over-provisioning, and to improve the management of cluster 120, capacity monitoring module 230 may use default current utilization values for new or young VMs 127 to determine the net capacity availability of cluster 120. The artificial current utilization values may be used until new VMs reach a maturity threshold, as described and illustrated in more detail with reference to FIGS. 3 and 4. In one embodiment, the maturity threshold may correspond to a defined metric value (e.g., a default time period, a monitored utilization level above a threshold, such as the average utilization value associated with a same application, etc.).

Communication interface 240 of cluster management device 110 may operatively couple cluster management device 110 and the host device 125. Cluster management device 110 and host devices 125 may be coupled together via a direction connection, over one or more communication network(s), or as otherwise necessary and/or desired.

Cluster management device 110 may be a standalone device, or it may be integrated with one or more other devices or apparatuses (not shown). In one embodiment, cluster management device 110 may include or may be hosted by one of host devices 125. Other arrangements are also possible. One or more of the devices of cluster management device 110 may be in the same or in a different communication network, including, for example, one or more public, private, or cloud networks.

Host devices 125 may be any type of computing device capable of hosting the VMs 127. Accordingly, each of host device 125 may include one or more processors or CPUs, memory, and a communication interface, which are coupled together by a bus or other communication link, although other numbers and/or types of network devices could be used.

Host devices 125 may execute one or more hypervisors (not shown) to facilitate utilization of the processors, memory, and other hardware of the host devices by VMs 127. Each VM 127 may host an instance of an application that is accessible by one or more of client devices 140 via communication network(s) 150.

In one embodiment, client devices 140 may include any type of computing device that may interface with applications associated with VMs 127. Each client device 127 may include a processor, a memory, and a communication interface, which may be coupled together by a bus or other communication link, although other numbers and/or types of network devices could be used.

In one embodiment, client devices 140 may be coupled to cluster 120 by communication network(s) 150. Other types and/or numbers of communication networks or systems with other types and/or numbers of connections and/or configurations to other devices and/or elements may be used as is necessary and/or desired.

In one embodiment, communication network(s) 150 may include local area network(s) (LAN(s)) or wide area network(s) (WAN(s)), and may use TCP/IP over Ethernet and industry-standard protocols, although other types and/or numbers of protocols and/or communication networks may be used. Communication network(s) 150 may use any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

Although the exemplary network environment with the cluster management device, host devices, client devices, and communication network(s) are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In one embodiment, one or more of the devices depicted in the network environment, such as cluster management device 110, host devices 125, or client devices 140, for example, may be configured to operate as virtual instances on the same physical machine. In other words, one or more of cluster management device 110, host devices 125, or client devices 140 may operate on the same physical device rather than as separate devices communicating through communication network(s) 150. In addition, there may be a greater or fewer number of cluster management devices 110, host devices 125, or client devices 140 than illustrated in FIG. 1.

In addition, two or more computing systems or devices may be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of improved management of VM clusters will now be described with reference to FIGS. 1-4. Referring more specifically to FIG. 3, a flowchart of an exemplary method for improved management of VM clusters is illustrated. In step 300, the cluster management device may periodically monitor utilization level(s) of the VMs in the cluster to determine, and selectively store, current utilization value(s) for each of the VMs. For example, the cluster management device may monitor the CPU and memory utilization levels for each of the VMs in order to generate current utilization values, and may selectively store the current utilization values in the utilization table. Other types values may also be monitored and stored as is necessary and/or desired.

In one embodiment, the cluster management device may optionally not replace a current utilization value based on a utilization level determined in step 300 for VM(s) for which an associated a defined metric value (e.g., a time period) stored in the utilization table has not lapsed or been reached. A defined metric value may be set, as described and illustrated in more detail below with reference to step 314, for example, for relatively young VMs.

In one embodiment, if a time period has lapsed for a particular one of the young VMs based on a current time, indicating that the young VM is now a mature VM, then the cluster management device may store the determined current utilization value(s), and may optionally remove the indication of the time period associated with the VM from the utilization table. Other types of flags or indications may be used to indicate that a VM is a young VM for which the stored current utilization value(s) should not be updated or replaced.

In step 302, the cluster management device may generate utilization metric value(s) for each of the application(s) associated with the VMs. An example utilization metric value may include an average or maximum utilization value. Other types of utilization metric value(s) may also be generated as is necessary and/or desired.

In one embodiment, the cluster management device may generate or update a stored utilization metric value for the application(s) based on the current utilization values for the VMs as determined in step 300. The utilization metric value(s) may correspond to a current or historical utilization, or some other calculation, and the utilization metric value(s) may be generated in other ways. The association of the application(s) (e.g., application IDs) with the VMs and with particular utilization metric value(s) may be maintained in the utilization table.

In step 304, the cluster management device may determine whether a capacity threshold has been reached for the cluster indicating that there is insufficient available capacity to deploy or provision one or more new VMs on one or more of the host devices. The capacity threshold may be dynamic and/or configurable and may be a fixed value or based on a percentage. Other types of capacity thresholds can be used may be used as is necessary and/or desired. In one embodiment, the stored current utilization value(s) for each of the VMs may be aggregated and compared to a capacity threshold to determine whether the capacity threshold has been reached. If the cluster management device determines that the capacity threshold has not been reached, then the "No" branch is taken to step 306.

In step 306, the cluster management device may provision one or more new VMs into the cluster. The cluster management device may optionally determine which application(s) are to be associated with the newly-provisioned VMs based on the monitoring in step 300. Alternatively, an administrator may provide input to the cluster management device, indicating, for example, that one or more VMs are to be associated with instance(s) of a new application.

In step 308, the cluster management device may determine whether one or more of the new VM(s) are associated with an existing application. If the cluster management device determines that the new VM(s) are not associated with an existing application, then the "No" branch is taken to step 310.

In step 310, the cluster management device may set stored current utilization value(s) for the new VM(s) in the utilization table based on default utilization value(s). The default utilization value(s) may be established by an administrator, or may be dynamically calculated and stored in the memory. Other ways of obtaining the default utilization value(s) may be used as is necessary and/or desired. If the cluster management device determines that the new VM(s) are associated with an existing application, then the "Yes" branch is taken to step 312.

In step 312, the cluster management device may set stored current utilization value(s) for the new VM(s) in the utilization table based on utilization metric value(s) stored in the utilization table for a same application as associated with the new VM(s) (e.g., the utilization metric value(s) generated and stored in step 302). In one embodiment, the new VM(s) may have stored current utilization value(s) that are artificial and either default value(s) or previously-generated utilization metric value(s), instead of value(s) corresponding to the actual utilization.

Subsequent to setting the stored current utilization value(s) in either step 310 or 312, the cluster management device proceeds to step 314.

In step 314, the cluster management device may optionally store a default defined metric value (e.g., a default time period) in the utilization table to indicate that the stored current utilization value(s) for the new VMs should not be replaced or updated based on monitored utilization level(s). In other examples, another type of indication or flag can be used to indicate that the set current utilization value(s) are to remain valid and that the new VM(s) are young VMs for which a maturity threshold has not been reached.

By setting the defined metric value in the utilization table, the cluster management device will not replace the stored current utilization value(s) for the new or young VM(s) based on a currently-monitored utilization level, as described and illustrated earlier with reference to step 300. By maintaining the artificial utilization value(s) set in step 310 or 312, the cluster management device will utilize more accurate overall resource utilization level(s) to determine whether the capacity threshold is reached for the cluster in step 304, thereby reducing the likelihood that the cluster management device will over-provision the cluster.

Subsequent to setting the defined metric value for the new VMs in step 314, or if the cluster management device determines in step 304 that the capacity threshold has been reached and the "Yes" branch is taken, in step 316, the cluster management device may determine whether a maturity threshold has been reached for one or more of the VMs for which a defined metric value is stored in the utilization table, indicating that the VMs are young VMs.

The cluster management device may determine whether a maturity threshold has been reached for a young VM based on whether the monitored utilization level(s) for the VM in step 300 indicate that the VM has reached full utilization or utilization that correlates with the stored utilization metric value(s) for mature VMs associated with a same application (e.g., is within an established percentage of a stored maximum or average utilization value). Thus, if the cluster management device determines that the maturity threshold has not been reached for any of the young VMs, then the "No" branch is taken back to step 300.

If the cluster management device determines that the maturity threshold has been reached for one or more of the young VMs, then the "Yes" branch is taken to step 318. In step 318, the cluster management device may replace the stored current utilization value(s), previously set in step 310 or 312, with the current utilization value(s) determined for the VM(s) in step 300 based on the current or most-recent monitoring.

Thus if a young VM has reached a particular utilization level (e.g., full utilization), then the cluster management device considers the young VM to be a mature VM. The cluster management device will then begin using the monitored utilization level(s) to determine and store the current utilization value(s) in step 300, and use the stored current utilization value(s), instead of the artificial utilization value(s) set in step 310 or 312, in the determination in step 304.

Subsequent to replacing the stored current utilization value(s) for one or more of the VMs, the cluster management device may repeat the process. In one embodiment, one or more of steps 300-318 may be performed in parallel, or in a different order than described and illustrated with reference to FIG. 3.

Figure 4:
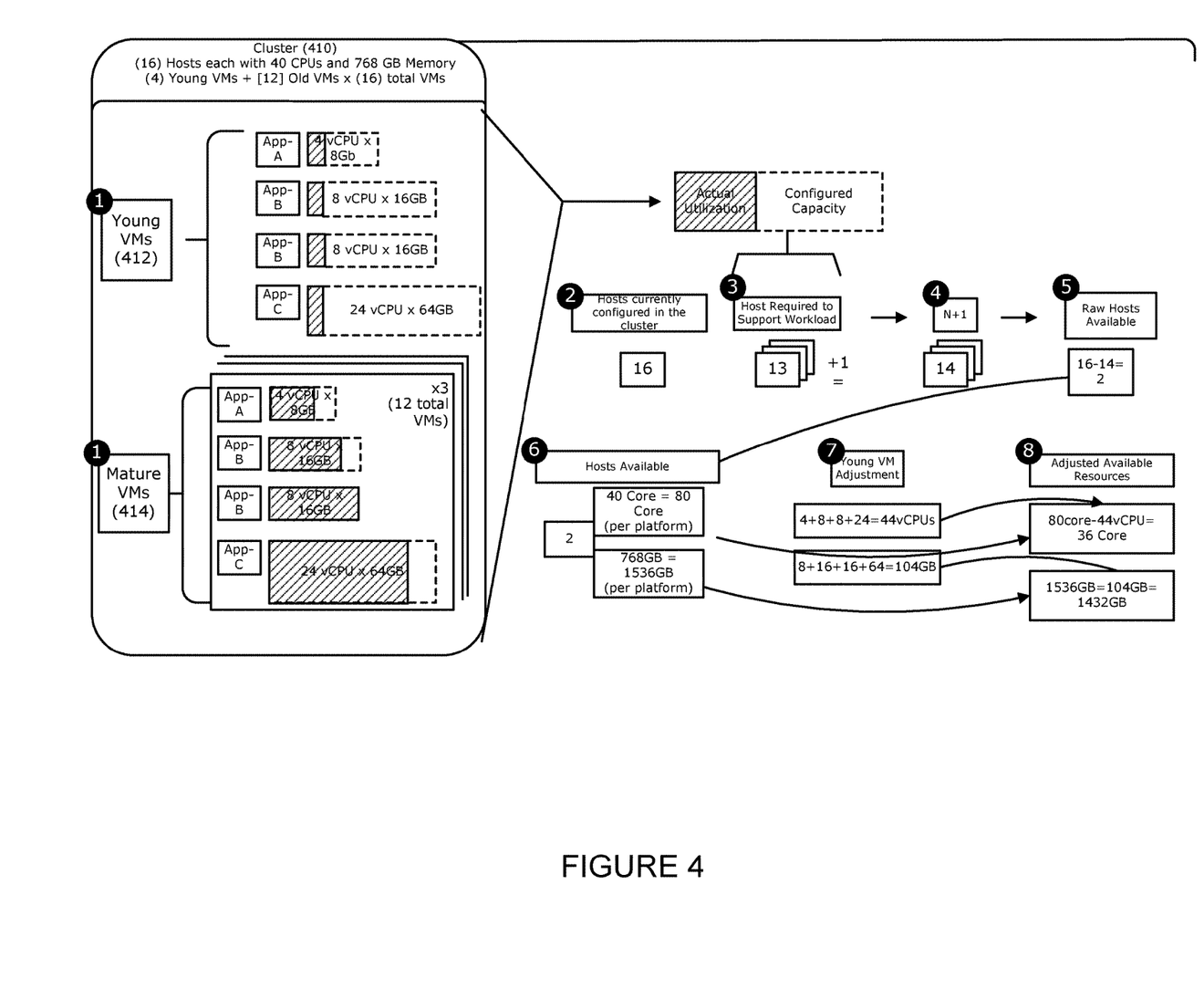
FIG. 4 depicts a flow diagram of an exemplary method for improved management of VM clusters according to one embodiment.

Referring to FIG. 4, an illustrative example of the application a method for improved management of VM clusters is provided. In this example (e.g., step 1), cluster 410 includes young VMs 412 and mature VMs 414. Mature VMs 414 may have an associated application loaded (e.g., App A, App B, App C) and may be operating at a business or production load with a current usage pattern indicative of an expected or average utilization level. Young VMs 412 are recently provisioned, and have not yet reached their expected or average business or production utilization level. The total utilization used to determine whether a capacity threshold is reached is the aggregate workload for the cluster.

Next, in step 2, the number of physical hosts that are configured in the cluster is determined. In this example, there are sixteen physical host devices configured in cluster 410.

Next, in step 3, an analysis plan may be run (e.g., daily) and reports the number of physical hosts (N) are required to satisfy the workload demand being placed on the cluster at a given utilization target. In this example, thirteen host devices are required to satisfy the current workload demand being placed on cluster 410.

Next, in step 4, an additional host device may be added for resilience.

In step 5, to determine the raw amount of available resources (in physical hosts), the N+1 number is subtracted from the current number of hosts in the cluster. This provides the number of hosts worth of capacity that could be consumed by additional workload. In this example, there are two host devices available to support additional VMs.

In step 6, the number of available hosts are converted into CPU and memory components based on the hardware from which the cluster is built. In this example, based on the two available host devices, there are 80 processing cores and 1536 GB of memory available.

In step 7, since young VMs are not at business load, the total resources they would consume is determined by looking up typical utilization of resources by the application deployed on the VM. In this example, the young VMs 412 are associated with applications corresponding to average historical utilization values of 4, 8, 8, and 24 vCPUs (44 total vCPUs), and 8, 16, 16, and 64 GB of memory (104 GB of memory).

Next, in step 8, to provide the real available capacity, the projected resource consumption of young VMs (step 7) is subtracted from the gross available resources (step 6) which results in the net available resources for new VMs. In this example, the 80 processing cores are subtracted by the 44 total vCPUs, leaving 36 cores available, and the 1536 GB of memory are subtracted by the 104 GB of memory, leaving 1432 GB of memory available. The available processor and memory capacity can then be used to determine whether a capacity threshold has been reached such that a particular number of new VMs should be provisioned.

Accordingly, with this technology, VM clusters are more effectively managed to avoid over-provisioning resulting in improved application performance and end-user experience. In particular, this technology advantageously adjusts current utilization for new or young VMs to account for a delay in those types of VMs reaching maturity or a business or production average or expected workload. With the adjusted current utilization, a more accurate assessment of the capacity of the cluster can be generated to facilitate a more effective provisioning of VMs.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for improved management of virtual machine (VM) clusters, comprising:
   in a virtual machine cluster management device comprising at least one computer processor:
      determining a current utilization value for each of a plurality of virtual machines (VMs) in a virtual machine cluster, the VMs associated with a plurality of applications;
      storing the current utilization values for each of the plurality of VMs in a utilization table;
      determining that a capacity threshold for the virtual machine cluster has not been reached based on an aggregation of the current utilization values for the plurality of VMs;
      provisioning a new VM into the virtual machine cluster;
      storing a default utilization value for the new VM in the utilization table in response to the new VM not meeting a maturity threshold indicating an age of the new VM, wherein the default utilization value is based on a utilization metric for an application that is to be associated with the new VM or a pre-set utilization value and the default utilization value is not a measured utilization value for the new VM;
      re-determining the capacity threshold based on the aggregated stored current utilization values for the plurality of VMs and the stored default utilization value for the new VM; and
      replacing the default utilization value for the new VM with a current utilization value in response to the maturity threshold for the new VM being reached.

2. The method of claim 1, further comprising:
   storing an indicator in the utilization table indicating that the new VM has not met the maturity threshold.

3. The method of claim 1, wherein the current utilization value for the new VM is not stored in the utilization table in response to the new VM not meeting the maturity threshold.

4. The method of claim 1, wherein the maturity threshold is based on an age of the new VM.

5. The method of claim 1, wherein the utilization metric value is based on an average utilization or a maximum utilization for the application.

6. The method of claim 1, wherein the utilization metric for the application is determined before the new VM is provisioned.

7. The method of claim 1, wherein the default utilization value is replaced with a current utilization value for the new VM when the maturity threshold for the new VM is reached.

8. A system for improved management of virtual machine (VM) clusters, comprising:
   a virtual machine cluster comprising a plurality of virtual machines (VMs), the VMs associated with a plurality of applications; and
   a virtual machine cluster management device comprising at least one computer processor and a memory storing a utilization table, the virtual machine cluster management device in communication with the VMs;
   wherein the virtual machine cluster management device performs the following:
      determine a current utilization value for each of the plurality of VMs in the virtual machine cluster;
      store the current utilization values for each of the plurality of VMs in the utilization table;
      determine that a capacity threshold for the virtual machine cluster has not been reached based on an aggregation of the current utilization values for the plurality of VMs;
      provision a new VM into the virtual machine cluster;
      store a default utilization value for the new VM in the utilization table in response to the new VM not meeting a maturity threshold indicating an age of the new VM, wherein the default utilization value is based on a utilization metric for an application that is to be associated with the new VM or a pre-set utilization value and the default utilization value is not a measured utilization value for the new VM;
      re-determine the capacity threshold based on the aggregated stored current utilization values for the plurality of VMs and the stored default utilization value for the new VM; and
      replacing the default utilization value for the new VM with a current utilization value in response to the maturity threshold for the new VM being reached.

9. The system of claim 8, wherein the virtual machine cluster management device stores an indicator in the utilization table indicating that the new VM has not met the maturity threshold.

10. The system of claim 8, wherein the current utilization value for the new VM is not stored in the utilization table in response to the new VM not meeting the maturity threshold.

11. The system of claim 8, wherein the maturity threshold is based on an age of the new VM.

12. The system of claim 8, wherein the utilization metric value is based on an average utilization or a maximum utilization for the application.

13. The system of claim 8, wherein the utilization metric for the application is determined before the new VM is provisioned.

14. The system of claim 8, wherein the default utilization value is replaced with a current utilization value for the new VM when the maturity threshold for the new VM is reached.

* * * * *